United States Patent [19]

Ulug

[11] Patent Number: 4,682,324
[45] Date of Patent: Jul. 21, 1987

[54] IMPLICIT PREEMPTIVE LAN

[75] Inventor: Mehmet E. Ulug, Schenectady, N.Y.

[73] Assignee: General Electric Company, Schenectady, N.Y.

[21] Appl. No.: 786,938

[22] Filed: Oct. 11, 1985

[51] Int. Cl.[4] .............................................. H04L 5/00
[52] U.S. Cl. ........................................ 370/85; 370/94; 340/825.5
[58] Field of Search ..................... 340/825.5, 825.51; 370/85, 94, 86, 87

[56] References Cited

U.S. PATENT DOCUMENTS

| | | | |
|---|---|---|---|
| 4,439,763 | 3/1984 | Limb | 340/825.5 |
| 4,510,599 | 4/1985 | Ulug | 370/85 |
| 4,517,670 | 5/1985 | Ulug | 370/85 |
| 4,532,626 | 7/1985 | Flores et al. | 370/85 |
| 4,543,574 | 9/1985 | Takagi et al. | 340/825.5 |
| 4,581,735 | 4/1986 | Flamm et al. | 370/85 |

*Primary Examiner*—Douglas W. Olms
*Assistant Examiner*—Melvin C. Marcelo
*Attorney, Agent, or Firm*—Richard V. Burgujian; James C. Davis, Jr.; Paul R. Webb, II

[57] ABSTRACT

Method and apparatus are provided for transmitting message signals in a high speed local area network which method performs as efficiently during intervals when few stations have messages to transmit as it does during intervals when many stations have messages to transmit. A station wishing to transmit a message first monitors the transmission medium to determine whether it is busy and, if not, initiates transmission of its message signal. If there are not predominant stations attempting to initiate transmission, then the subject station will continue its transmission until the completion thereof. If, however, a predominant station should attempt to initiate transmission at the same time as the subject station, i.e., a collision occurs, the predominant station wins and continues its transmission until the conclusion thereof. The subject station, being preempted, monitors a control bit contained in the preamble of each message signal to determine whether the control bit is set. When the subject station receives a message signal preamble having a control bit which is not set, the subject station sets the control bit, thereby reserving the right to transmit the next message signal.

12 Claims, 4 Drawing Figures

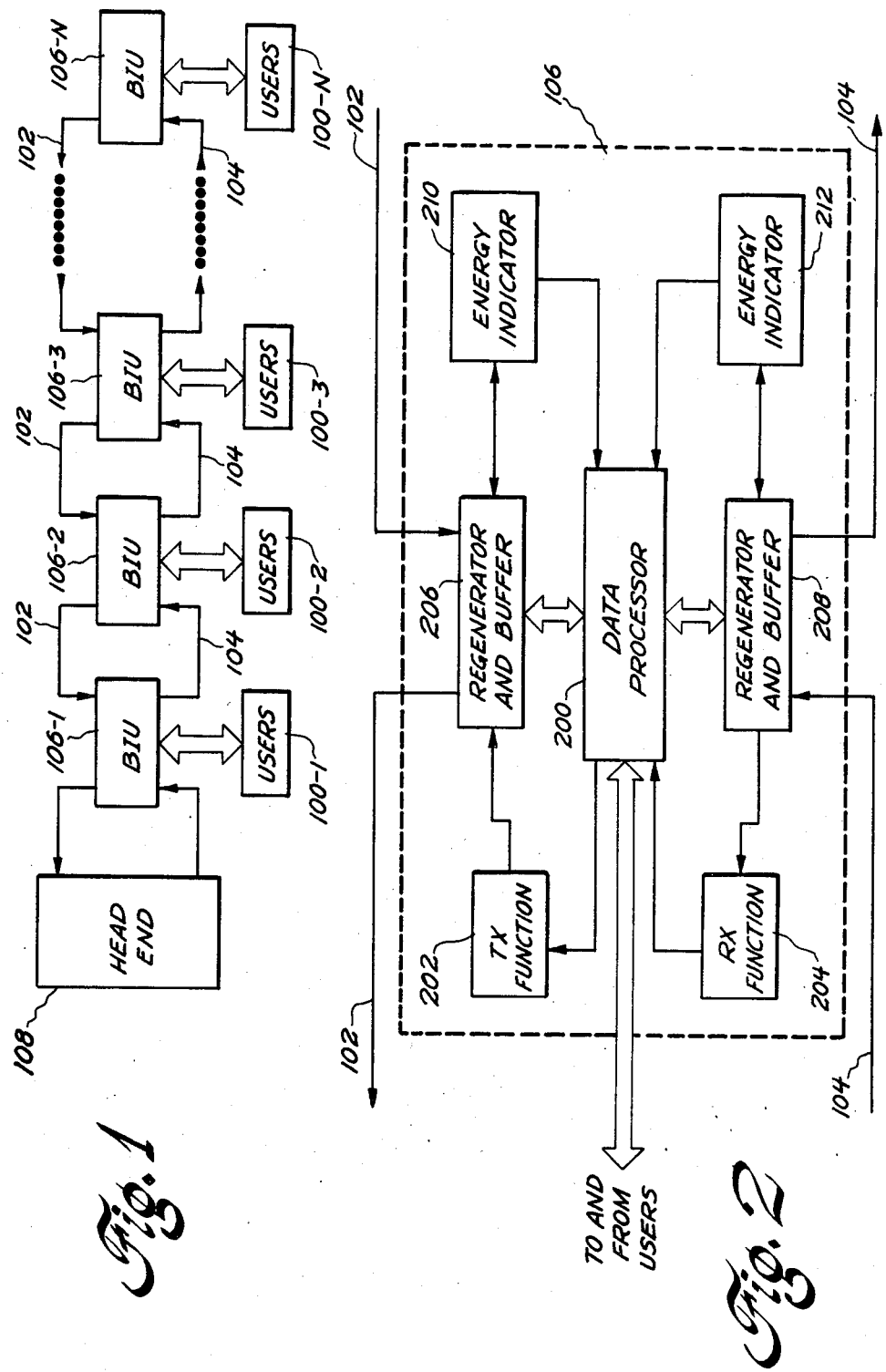

IMPLICIT PREEMPTIVE LAN

BACKGROUND OF THE INVENTION

The present invention is directed in general toward local area networks and, more particularly, toward an improved method for transmitting message signals in a local area network.

Continued progress in integrated semiconductor circuitry has led to widespread usage of autonomous computing devices such as personal computers, printing devices, storage devices, automated manufacturing devices, etc. With this increase in usage of personal computing devices comes the need to provide intercommunication among these devices. Hence, computing networks have been developed to allow one user of the network to exchange communications and/or data with other users of the network. These networks require communication protocols to allow exchange of the aforesaid information and/or data in the most expedient and efficient manner.

Prior art protocols for exchanging data among computing devices of a local area network fall generally into one of two categories, to wit, token passing or contention.

Generally, token passing protocols employ a token message signal which is passed from station to station within the network, each station being permitted to transmit message signals only after receiving the token message signal. Thereafter, each station transmits the token signal such that another station is permitted to transmit its message signals. These systems, however, incur unacceptable delays during periods where few stations have message signals to transmit and, therefore, those few stations having message signals to transmit must wait until the token signal is passed among the plurality of stations not having messages to transmit before they may gain access to the transmission medium.

Contention local area networks are those in which each station may gain access to the transmission medium to thereby transmit its message signal at any time the subject station determines the transmission medium is idle. When more than one station attempts to gain access to the transmission medium simultaneously, i.e., a collision occurs, each station will generally discontinue its transmission for a randomly selected time interval and, thereafter, re-attempt to gain access to the medium. These systems, however, incur unacceptable delays at times when many stations have message signals to transmit and, therefore, many collisions occur.

An improved contention system, the preemptive BID Communication System, disclosed in U.S. Pat. No. 4,517,670, provides a contention protocol wherein only those stations involved in a collision, i.e., preempted stations, are allowed to transmit following the collision. In accordance with the preemptive BID protocol, a communication period is provided after a collision. During the communication period preempted stations follow a method which allows them to transmit message signals in accordance with their physical location along the network transmission medium. While the preemptive BID protocol works well in networks where the time to transmit a message signal is on the order of, or greater than, the communication period (typically chosen to equal the two-way propagation delay of the network transmission medium), the system introduces considerable inefficiencies and waste in bandwidth in high speed networks where the time to transmit a message signal is less than the communication period.

Therefore, it is desirable to provide a protocol for transmitting message signals in a local area network which protocol works as efficiently during times when few stations have messages to transmit as it does during times when many stations have messages to transmit. Further, it is desirable to provide such a system which is efficiently used in high speed applications.

SUMMARY OF THE INVENTION

The above noted inadequacies of the prior art are addressed by providing method and apparatus for transmitting message signals in a high speed local area network, which method and apparatus works as efficiently during periods when many stations have message signals to transmit as it does when few stations have message signals to transmit.

In accordance with the method of the present invention, each message signal is provided with a transmit control bit. A station having a user message signal to transmit waits until the transmission medium is idle and then attempts to transmit its message signal as in a contention system. If a collision occurs, the most predominant station is permitted to complete its transmission while all other stations involved in the collision enter the preemptive mode. Each preempted station samples the incoming message signals to determine whether the transmit control bit thereof is set. If the transmit control bit is set, thus indicating that another station has reserved the right to transmit the next message signal, the subject station simply transmits the incoming message signal. If, however, the transmit control bit is not set, then the subject station will set the transmit control bit, transmit the incoming message signal and, thereafter, transmit its user message signal.

Apparatus for implementing the method described herein comprises a transceiver for receiving incoming message signals from a predominant station and transmitting these incoming message signals to a subordinate station over a segmented transmit medium. A data processor is provided and coupled to the transceiver for transmitting user message signals. The data processor is adapted to initiate transmission of its user message signals when the transmission medium is idle and, simultaneously therewith, to determine whether a predominant station is transmitting. If a predominant station is transmitting, the data processor is adapted to terminate its transmission and to monitor each incoming message signal received from the predominant station to determine whether the control bit thereof is set and, if so, to transmit the incoming message signal without alteration thereto. If, however, the control bit of the incoming message signal is reset, then the data processor is adapted to set this control bit before transmitting the incoming message signal and, thereafter, to transmit the user message signal.

It is, therefore, an object of the present invention to provide method and apparatus for efficiently transmitting message signals in a local area network.

It is a further object of the present invention to provide method and apparatus for transmitting message signals in a local area network which method and apparatus works as efficiently during times when many stations have messages to transmit as it does during times when few stations have messages to transmit.

It is a still further object of the present invention to provide method and apparatus for transmitting message signals in a local area network wherein the message signals are transmitted at very high rates, which method and apparatus works as efficiently when few stations have message signals to transmit as it does when many stations have message signals to transmit.

BRIEF DESCRIPTION OF THE DRAWINGS

Subject matter which is regarded as invention is particularly pointed out and distinctly claimed in the numbered paragraphs appended hereto. The invention, however, both as to organization and method of practice, may best be understood from a reading of the following detailed description taken in conjunction with the drawings in which:

FIG. 1 is an illustrative block diagram of a local area network including apparatus which is the subject of the present invention and adapted for implementing the methods which are the subject of the present invention;

FIG. 2 provides a more detailed illustrative block diagram of the BIUs of FIG. 1;

DETAILED DESCRIPTION OF THE DRAWINGS

Figure 3:
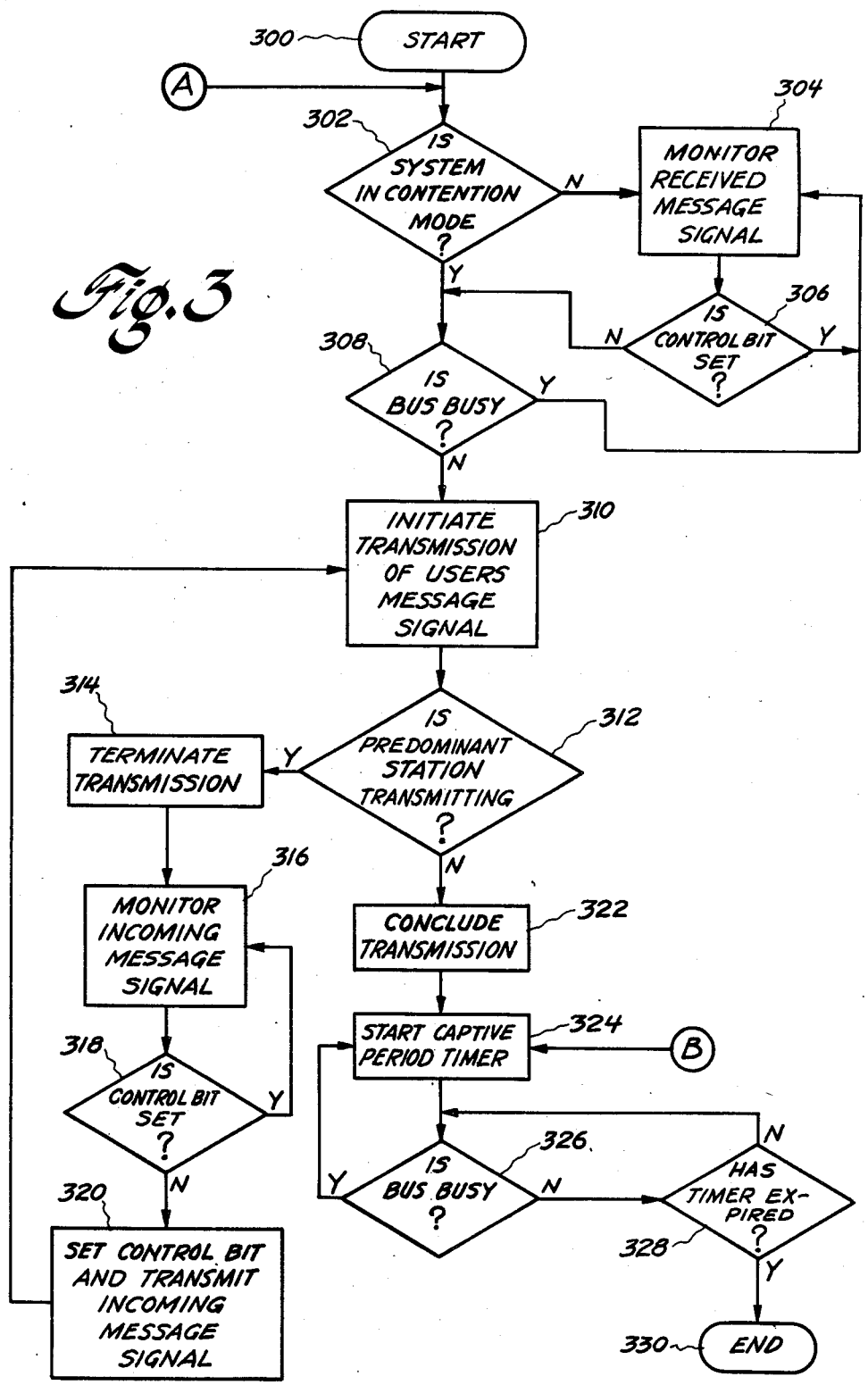
FIG. 3 contains a decisional flow diagram of the method by which each BIU of FIG. 1 accesses the transmit medium to transmit its user's message signals.

As mentioned hereinabove, the present invention is directed toward method and apparatus for transmitting message signals in a local area network wherein the message signals are transmitted at a very high rate, which method and apparatus works as efficiently during intervals where few stations have message signals to transmit as it does during intervals when many stations have message signals to transmit. As such, the present invention represents an improvement upon known local area network protocols such as those described in IEEE Project 802 Local Network Standards, Draft C (1982). Also, the subject invention comprises an improvement upon U.S. Pat. No. 4,517,670 issued May 14, 1985 to Ulug and assigned to the assignee of the present invention, which is incorporated herein, in its entirety, by the foregoing reference thereto.

A local area network, including apparatus for implementing the method which is the subject of the present invention, is shown in FIG. 1. Therein, a plurality of user devices 100-1 through 100-N are shown coupled to a segmented transmit bus 102 and a segmented receive bus 104 via a plurality of respective bus interface units (BIUs) 106-1 through 106-N. User devices 100 may comprise any of a plurality of autonomous user devices typically found in local area networks. As an example, user devices 100 may comprise personal computing devices, printing devices, memory devices, automated manufacturing devices, etc. While only one user device 100 is shown coupled to each BIU 106 in FIG. 1, it will be appreciated by those skilled in the art that a plurality of user devices 100 may be coupled to each BIU 106 for communication with transmit medium 102 and receive medium 104.

Transmit medium 102 and receive medium 104 may comprise any means for transmitting electrical and/or fiber optic information signals between user devices 100 via BIUs 106 as is known in the art. As an example, transmit medium 102 and receive medium 104 may comprise a co-axial cable, as available from the Belden Electric and Wire Cable Company, for transmitting AC modulated digital information signals. As a further example, transmit medium 102 and receive medium 104 may comprise high performance fiber optic cable, such as that available from the Hewlett Packard Company, part number HFBR3001, for transmitting optical digital information signals.

It will be appreciated by those skilled in the art that while transmit medium 102 and receive medium 104 are shown as discrete elements in FIG. 1, they may actually comprise the same physical cable wherein transmissions occur at a first electrical frequency and reception occurs at a second electrical frequency. Further, it will be apparent to those skilled in the art that should transmit medium 102 and receive medium 104 comprise separate physical cables, receive medium 104 may comprise a common receive medium, as will be discussed more fully hereinbelow.

Transmit medium 102 is shown coupled to receive medium 104 via a remodulator or head end 108. Head end 108 is provided for receiving transmissions from transmit medium 102 and retransmitting this information to receive medium 104. When transmit medium 102 and receive medium 104 comprise the same physical cable, head end 108 may be further adapted to receive message signals from transmit medium 102 over a first frequency and transmit these message signals to receive medium 104 over a second frequency. Alternatively, should transmit medium 102 and receive medium 104 comprise separate physical cables, head end 108 may simply comprise a repeater or other similar device for receiving and transmitting message signals and need not comprise a frequency translator as described above.

BIUs 106-1 through 106-N are provided for transmitting user message signals to transmit medium 102 in accordance with the methods as described herein. The operation of each BIU 106 may be best described by reference to FIG. 2 wherein a more detailed block diagram of each BIU 106 is provided. It will be appreciated by those skilled in the art that while only one BIU 106 is shown in FIG. 2, that each BIU 106-1 through 106-N is constructed and operates in a manner similar to BIU 106 of FIG. 2.

Referring to FIG. 2, each BIU 106 is shown to comprise a data processor 200 coupled to users 100 (not shown) for receiving user message signals therefrom and transferring received message signals thereto. Data processor 200 is adapted to transmit and receive message signals via a transmitter 202 and a receiver 204, respectively. Transmitter 202 is provided for receiving digital message signals from data processor 200 and for preparing these signals for transmission. Hence, in addition to buffer memory, transmitter 202 comprises circuitry adapted to add cyclic redundancy check (CRC) bits, add address bits, and perform other functions necessary to prepare data for transmission, as is known in the art. Likewise, receiver 204 is provided for receiving transmitted data and preparing the received data for use by data processor 200. Hence, receiver 204 comprises buffer memory and additional circuitry for performing the CRC data check, recognizing and removing address bits, and performing other functions to prepare the received message for use by data processor 200.

Accordingly, transmitter 202 and receiver 204 may comprise any device, or combination of devices, adapted for performing the respective pre-transmission data processing functions and post reception data processing functions described above. It will be apparent to those skilled in the art that while transmitter 202 and receiver 204 are shown as discrete elements in FIG. 2, they may actually comprise one integrated transceiver device for performing each of the functions described above.

Data processor 200 and transmitter 202 are both shown coupled to a regenerator and buffer 206. Regenerator and buffer 206 is provided for receiving incoming message signals from a predominant station and transmitting these incoming message signals to a subordinate station via transmit medium 102. Likewise, data processor 200 and receiver 204 are both coupled to a regenerator and buffer 208. Regenerator and buffer 208 is provided for receiving message signals from the subordinate station and transmitting these message signals to the predominant station via receive medium 104. In so doing, each regenerator 206 and 208 is adapted for reconstructing each data bit so that bits which may have been slightly deteriorated upon reception will be reconstructed before being transmitted. Digital circuitry for performing this function is well known in the art.

Predominant station as used herein refers to that station from which regenerator 206 of the subject BIU receives incoming message signals and that station to which regenerator 208 of the subject BIU transmits received message signals. Subordinate station as used herein refers to that station to which regenerator 206 of the subject station transmits incoming message signals and that station from which regenerator 208 of the subject station receives received message signals.

Regenerators 206 and 208 may each comprise a receiver for receiving message signals from a particular medium and a transmitter for transmitting message signals to the same medium from which they were received. As an example, regenerators 206 and 208 may comprise a Model 30-0078-3 modem as available from the Computrol Corporation for receiving and transmitting A.C. modulated digital signals. Alternatively, where transmit medium 102 and receive medium 104 comprise fiber optic cable, regenerators 206 and 208 may comprise a high speed transmitter model number HFBR-1001 and a high speed receiver model number HFBR-2001, both available from the Hewlett Packard Company.

Regenerator and buffer 206 is also coupled to data processor 200 such that data processor 200 can monitor the status of selected bits of the incoming message signal and occasionally alter the status thereof. Also, regenerator 208 is coupled to data processor 200 such that data processor 200 can monitor selected bits of the received message signal. Accordingly, regenerators 206 and 208 may further comprise buffer memory for temporarily storing at least one bit of the received message signal. While transmitter 202, receiver 204, and regenerators 206 and 208 are shown as discrete elements in FIG. 2, it will be appreciated by those skilled in the art that these devices may comprise one integrated circuit adapted for performing the functions as described hereinabove.

Data processor 200 is also shown coupled to regenerators 206 and 208 via an energy indicator 210 and an energy indicator 212, respectively. Energy indicators 210 and 212 are provided for indicating the receipt of a message signal by regenerators 206 and 208, respectively. Energy indicators 210 and 212 may comprise any combination of devices capable of indicating when a predetermined threshold of energy is received by its respective regenerator. As an example, energy indicators 210 and 212 may comprise an energy indication device such as that shown and described in the aforereferenced U.S. Pat. No. 4,517,670 to Ulug.

Data processor 200 may comprise any signal processing apparatus for implementing the methods as described hereinbelow with reference to FIG. 3. As an example, data processor 200 may comprise a microprocessing device including peripheral digital elements, e.g., latches, timers, memory, etc., adapted for communication with user 100 and programmed for implementing the methods as described herein. See, e.g., the aforereferenced U.S. Pat. No. 4,517,670, to Ulug.

In an alternative embodiment, BIUs 106 may be purchased as a single integrated device and, thereafter, programmed for implementing the method as described herein. As an example, each BIU 106 may comprise a model SBC 86/51 bus interfacing unit as available from the Intel Corporation.

The operation of data processor 200 may best be described by reference to FIG. 3, wherein a decisional flow diagram is provided for illustrating the subject method for transmitting message signals in the local area network of FIG. 1. Briefly, the system operates in two modes, to wit, contention and preemptive. In the contention mode transmission is accomplished by sampling the transmission medium to determine whether it is busy and transmitting whenever the medium is available. Should a collision occur, then the system enters the preemptive mode. In the preemptive mode transmission occurs in accordance with the physical location of preempted stations, i.e., those stations involved in the collision, along the transmission medium.

Initially the most predominant one of the preempted stations wins the collision and is permitted to transmit. Each message signal includes a control bit contained in its preamble which is used by preempted stations to reserve the right to transmit the next message signal. The predominant station transmits its message signal with the control bit not set. The first preempted station to receive the incoming message signal from the transmit medium will set the control bit and thereby reserve the right to transmit the next message signal. It in turn will transmit its message signal with the control bit not set and thereby allow the succeeding preempted station to reserve the right to transmit.

It will be noted that while the network is operating in the preemptive mode only preempted stations are permitted to set the control bit and, thereby, transmit message signals. It will be further noted that all stations can determine the status of the network by examining the control bit of message signals received by regenerator 208 via receive medium 104 (FIG. 2). If the control bit is set, then a preempted station has reserved the right to transmit and, therefore, the network is operating in the preemptive mode. If, however, the control bit is not set, then there are no preempted stations remaining and, therefore, the network is operating in the contention mode.

With respect to FIG. 3, a BIU, or station, having a user message to transmit enters the routine at step 300 and proceeds to step 302 where the BIU first determines whether the system is operating in a contention mode. It will be noted that each BIU 106 of FIG. 1 is constantly monitoring the status of the transmission network, as described above, to determine whether the network is operating in the contention mode or preempted mode.

Thus, upon leaving step 300 and making the determination of step 302, the BIU will be checking a flag, register, or other recording device to determine whether any preempted BIUs have reserved the right to transmit the next message signal.

Should the subject BIU determine that a BIU is operating in the preemptive mode, i.e., determines in step 302 that the system is not in the contention mode, then the subject BIU will monitor each message signal received from medium 104, step 304, and determine whether the control bit of the received message signal is set, step 306. It should be noted that received message signal is used herein in contradistinction to incoming message signal to differentiate a message signal which is being received and transmitted by regenerator 208 as opposed to a message signal which is being received and transmitted by regenerator 206. Hence, monitoring a received message signal means monitoring the status of the control bit of message signals received by regenerator 208. It will be further noted that data processor 200 is coupled to regenerator 208 for monitoring the bits received by the regenerator, as described hereinabove with reference to FIG. 2.

If the control bit of the received message signal is set, step 306, then the subject BIU will continue to monitor each received message signal until it is determined that the control bit is not set, step 306. By continually performing steps 304 and 306, the subject BIU will determine when the system leaves the preemptive mode, i.e., all preempted BIUs have transmitted their message signals and, therefore, the system is operating in the contention mode.

Should the subject BIU determine that the system is initially operating in the contention mode, step 302, or alternatively, should the subject BIU determine that the system is leaving the preemptive mode, step 306, then the subject BIU will sample the transmission medium to insure that no other stations are transmitting, step 308. It will be appreciated by those skilled in the art that transmission medium as used herein refers to both transmit medium 102 and receive medium 104. Hence, the decision of step 308 is to determine whether both transmit medium 102 and receive medium 104 are idle and, if so, proceeding to step 310 and, if not, returning to step 304 to determine if the system is again operating in the preemptive mode. It will be further noted by those skilled in the art that the determination of step 308 can be readily made by data processor 200 (FIG. 2) by simply sampling the energy indication signals received from energy indicators 210 and 212, as described hereinabove with reference to FIG. 2.

After the subject BIU has determined that the system is operating in the contention mode and that no other stations are transmitting, then the subject station will proceed to step 310 where it will initiate transmission of its user's message signal. Contemporaneous with initiation of transmission of its user's message signal, or immediately thereafter, the subject station will monitor the transmission medium to determine whether a predominant station is transmitting, step 312. As mentioned hereinabove, predominant station is used to refer to the station from which the subject station receives incoming message signals and subordinate station is used to refer to stations from which the subject station receives received message signals.

If a predominant station is transmitting, step 312, then the subject station will terminate its transmission, step 314, and monitor the incoming message signal, step 316, to determine whether the control bit thereof is set, step 318. It will be noted that data processor 200 of FIG. 2 is coupled to regenerator 206 for monitoring the control bit of the incoming message signal as described hereinabove with reference to FIG. 2.

If the control bit of the incoming message signal is set, step 318, then a predominant BIU has been preempted and has reserved the right to transmit by setting the control bit of the incoming message signal. Hence, the subject station will continue to monitor all incoming message signals, step 316, until it is determined that a control bit is not set, step 318. Thereafter, the subject station will set the control bit of the incoming message signal before transmitting the incoming message signal to its subordinate station, step 320. By setting the control bit of the incoming message signal, step 320, the subject station has reserved the right to transmit its user's message signal following the transmission of the incoming message signal. Therefore, after transmission of the incoming message signal has been completed, step 320, the subject station will return to step 310 and again initiate transmission of its user's message signal.

It will be noted by those skilled in the art that, barring the effect of noise and other circuit inconsistencies which may cause errors to occur in transmission of message signals, no other station will be transmitting during the period in which the subject station is initiating its transmission, step 310. Nonetheless, to compensate for the effect of noise and other inefficiencies in the message signal transmission, the subject station will again deteremine whether a predominant station is transmitting, step 312, and if so will terminate its transmission as before, step 314. If, however, no predominant station is transmitting, step 312, then the subject station will conclude its transmission, step 322, and will start a captive period timer, step 324.

The captive period is provided to prevent BIUs which have transmitted a message signal from transmitting another message signal until all other BIUs having message signals to transmit have had an opportunity to do so. Hence, each BIU which has successfully transmitted a message signal via steps 310-322, will not be permitted to transmit another message signal until it has determined that the transmission medium has been idle for the captive period. To this end, after starting the captive period timer, step 324, the subject station will continually monitor the transmission medium, step 326, to determine whether another station is transmitting and, if so, will reset the captive period timer, step 324. If the transmission medium is idle, step 326, then the subject station will also monitor the captive period timer, step 328, to determine whether the captive period timer expires before the transmission medium is determined to be busy, step 326. After the transmission medium has been idle for the captive period, i.e., the decision of step 328 is affirmative before that of step 326, then the subject station will end the routine, step 330, and will again be permitted to transmit message signals. The captive period is typically chosen to equal the two way propagation delay of the transmission medium.

In an improved embodiment, priorities may be assigned to message signals by allowing a station which has been involved in a collision with a predominant station to nonetheless complete its transmission by buffering the incoming message signal.

Figure 4:
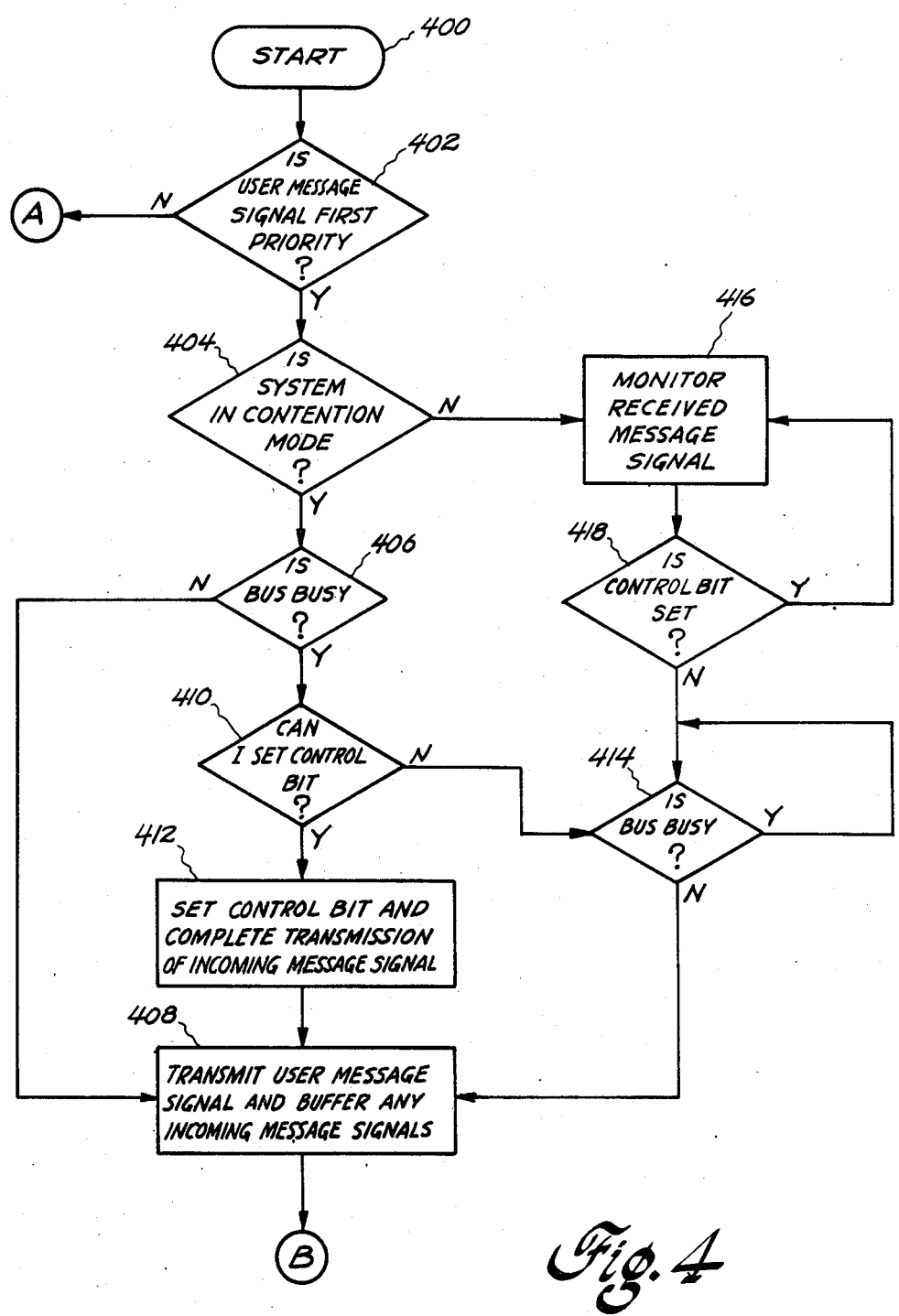
FIG. 4 contains a decisional flow diagram illustrating an improvement to the method of FIG. 3 to allow prioritized message transmission.

With reference to FIG. 4, there is provided an illustrative block diagram for improving the method of FIG. 3 to allow a station to transmit first priority message signals. Therein, as in FIG. 3, a station having a message to transmit enters the routine in step 400 and, thereafter, will determine whether its user message signal is a first priority message signal, step 402. If its user message signal is not a first priority message signal, then the subject station will proceed to step 302 (FIG. 3) to transmit its message signal in accordance with the method as described above. If, however, the user message signal is a first priority message signal, step 402, then the subject station will determine whether the system is operating in the contention mode or the preemptive mode, step 404, as described hereinabove with reference to step 302 of FIG. 3. If the system is operating in the contention mode, i.e., there are no preempted stations, then the subject station will monitor the transmission medium to determine whether the bus is busy, step 406, as described hereinabove with reference to step 308 of FIG. 3. If the bus is not busy, then the subject station will transmit its user message signal, step 408. Priority is obtained here by preventing any predominant stations from preempting the subject station's transmission. To this end, the subject station will buffer any incoming message signals, step 408, which message signals would have otherwise preempted the subject stations transmission as in step 312 of FIG. 3.

Should the subject station determine in step 406 that the transmission medium is busy then the subject station will attempt to set the control bit of the message signal on the transmission medium, steps 410 and 412. If the subject station can set the control bit, step 410, it will do so, step 412, and thereafter transmit its user message signal and buffer any incoming message signals, step 408. If, however, the subject station cannot set the control bit, step 410, then it will monitor the transmission medium until it is determined to be idle, step 414, and then transmit its user message signal and buffer any incoming message signals, step 408. In this manner priority is obtained by allowing the subject station to transmit its first priority message signal while the system is operating in the contention mode, without first waiting for the transmission medium to become idle, by setting the control bit of a passing message signal and thereby reserving the right to transmit the next message signal.

Lastly, should the subject station determine in step 404 that the system is operating in the preemptive mode, then the subject station will monitor the transmission medium until all preempted stations have transmitted their message signals, steps 416 and 418. Thereafter, the subject station will monitor the transmission medium until it is determined idle, step 414. The subject station will then transmit its user message signal and buffer any incoming message signals, step 408. It will be noted by those skilled in the art that when the subject station determines in step 404 that the system is operating in the preemptive mode, it will wait until all preempted stations have transmitted their message signals, steps 416 and 418, before transmitting its message signal. Although this method prevents readytransmission of first priority message signals while the system is operating in the preemptive mode, it is nonetheless desirable in that allowing all preempted stations to transmit their message signals gives the network bounded delays and, therefore, insures transmission of each message signal within a prescribed period of time.

After transmitting its user message signal, step 408, the subject station will be prevented from transmitting for the captive interval as described hereinabove with reference to FIG. 3. Hence, after transmitting its user message signal, step 408, the subject station will proceed to step 324 where it will monitor the transmission medium until it is determined to be idle for the captive period as described hereinabove with reference to FIG. 3.

While only several presently preferred embodiments of my novel invention have been described in detail herein, it will be apparent to those of skill in the art that many modifications and variations thereof exist without departing from the true scope and spirit of the invention. It is my intention, by the claims appended hereto, to embody all such variations and modifications.

What is claimed is:

1. A method for transmitting user message signals in a local area network having active stations wherein a subject station receives incoming message signals from a predominant station and transmits said incoming message signals to a subordinate station said method comprising the steps of:
    (a) initiating transmission of said user message signal when the transmission medium of said network is idle and determining whether said predominant station is initiating transmission;
    (b) completing transmission of said user message signal if said predominant station is not transmitting;
    (c) terminating transmission of said user message signal if said predominant station is transmitting; and
    (d) reserving the right at said subject station to transmit said user message signal and transmitting said user message signal after said predominant station has completed transmission.

2. The method as recited in claim 1 wherein the step of reserving the right at said subject station to transmit said user message signal comprises the substeps of:
    (e) providing each message signal with a transmit control bit;
    (f) receiving one of said incoming message signals from said predominant station;
    (g) determining whether said transmit control bit of said incoming message signal is set and, if so, performing step (h) and, if not, performing step (i);
    (h) transmitting said incoming message signal to said subordinate station and repeating step (f); and
    (i) setting said transmit control bit of said incoming message signal, transmitting said incoming message signal to said subordinate station and transmitting said user message signal.

3. The method as recited in claim 2 wherein the step of initiating transmission and determining whether said predominant station is transmitting comprises the substeps of:
    (j) determining whether the network is operating in the preemptive mode and, if so, performing step (k) and, if not, performing step (1), said preemptive mode being one wherein at least one station is reserving the right to transmit its user message signal;,
    (k) monitoring the network until it is no longer operating in the preemptive mode and, thereafter, repeating step (j);
    (1) monitoring the network to determine whether another station is transmitting and, if not, performing step (m) and, if so, performing step (j); and
    (m) initiating transmission of said user message signal and simultaneously therewith determining whether said predominant station is initiating transmission and, if not, performing step (b) and, if so, performing step (c).

4. The method as recited in claim 3 further comprising the steps of:
(n) delaying for a predetermined captive time interval after transmitting said user message signal before attempting to transmit another said user message signal.

5. The method as recited in claim 1 wherein each said user message signal may be of first or second priority, said method further comprising the steps of:
(o) determining whether said user message signal is of said first priority and, if not, performing step (a) and, if so, performing step (p);
(p) initiating transmission of said user message signal when said transmission medium is idle and buffering any of said incoming message signals until transmission of said user message signal is complete and, thereafter, transmitting said incoming message signal.

6. The method as recited in claim 5 wherein step (p), initiating transmission and buffering of said incoming message signals, comprises the substeps of:
(q) determining whether the transmission medium is busy with a transmitted message signal and, if not, performing step (r) and, if so, performing step (s);
(r) initiating transmission of said user message signal and buffering any said incoming message signal until transmission of said user message signal is complete and, thereafter, transmitting said incoming message signal;
(s) determining whether it is possible to set the transmit control bit of said transmitted message signal and, if so, performing step (t) and, if not, performing step (u);
(t) setting the transmit control bit of said transmitted message signal and, thereafter, performing step (r); and
(u) monitoring said transmission medium until transmission of said transmitted message signal is complete and, thereafter, performing step (r).

7. The method as recited in claim 6 wherein step (p), initiating transmission and buffering said incoming message signals, further comprises the substeps of:
(v) determining whether the network is operating in the preemptive mode and, if so, performing step (w) and, if not, performing step (q); and
(w) monitoring the network until it is no longer operating in the preemptive mode and, thereafter, performing step (r).

8. The method as recited in claim 7 wherein the step of reserving the right to transmit said user message signal comprises the substeps of:
(x) providing each message signal with a transmit control bit;
(y) receiving said incoming message signal from said predominant station;
(z) determining whether said transmit control bit of said incoming message signal is set and, if so, performing step (aa) and, if not, performing step (ab);
(aa) transmitting said incoming message signal to said subordinate station and repeating step (y); and
(ab) setting said transmit control bit of said incoming message signal, transmitting said incoming message signal to said subordinate station and transmitting said user message signal.

9. The method as recited in claim 8 wherein the step of initiating transmission and determining whether said predominant station is transmitting comprises the substeps of:
(ac) determining whether the network is operating in the preemptive mode and, if so, performing step (ad) and, if not, performing step (ae), said preemptive mode being one wherein at least one station is reserving the right to transmit its user message signal;
(ad) monitoring the network until it is no longer operating in the preemptive mode and, thereafter, repeating step (ac);
(ae) monitoring the network to determine whether another station is transmitting and, if not, performing step (af) and, if so, performing step (ac); and
(af) initiating transmission of said user message signal and simultaneously therewith determining whether said predominant station is initiating transmission and, if not, completing transmission of said user message signal and, if so, performing step (c).

10. The method as recited in claim 9 further comprising the steps of:
(ag) delaying for a predetermined captive time interval after transmitting said user message signal before attempting to transmit another said user message signal.

11. Apparatus for transmitting user message signals over a transmission medium of a local area network comprising:
transceiver means for transmitting and receiving message signals, said transceiver means being adapted to receive incoming message signals from a predominant station and to transmit said incoming message signals to a subordinate station; and
signal processing means coupled to said transceiver means for transmitting said user message signals, said signal processing means being adapted to monitor said transmission medium to determine whether another station is transmitting and for transmitting said user message signals if said transmission medium is idle, said signal processing means being further adapted to monitor said transceiver means upon initiation of transmission of said user message signal to determine whether said predominant station is transmitting and, if not, to complete transmission of said user message signal and, if so, to terminate transmission of said user message signal and, thereafter, to monitor each said incoming message signal to determine whether a control bit is set and, if so, to transmit said incoming message signal via said transceiver means and, if not, to set said control bit, transmit said incoming message signal and transmit said user message signal.

12. Apparatus as recited in claim 11 wherein said signal processing means is further adapted to delay for a predetermined captive time interval after transmitting said user message signal before attempting to transmit another said user message signal.

* * * * *